(12) United States Patent
Hallak et al.

(10) Patent No.: US 10,817,212 B2
(45) Date of Patent: Oct. 27, 2020

(54) METHOD AND APPARATUS FOR CREATING A SHORT HASH HANDLE HIGHLY CORRELATED WITH A GLOBALLY-UNIQUE HASH SIGNATURE

(71) Applicant: EMC IP Holding Company LLC, Hopkinton, MA (US)

(72) Inventors: Renen Hallak, Sde Warburg (IL); Ronen Kalish, Tel Aviv (IL); Kobi Luz, Rehovot (IL); Ehud Rokach, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 28 days.

(21) Appl. No.: 16/438,014

(22) Filed: Jun. 11, 2019

(65) Prior Publication Data

US 2019/0312732 A1    Oct. 10, 2019

Related U.S. Application Data

(63) Continuation of application No. 15/067,574, filed on Mar. 11, 2016, now Pat. No. 10,396,994, which is a continuation of application No. 14/144,644, filed on Dec. 31, 2013, now Pat. No. 9,286,003.

(51) Int. Cl.
| | |
|---|---|
| *G06F 3/06* | (2006.01) |
| *G06F 16/901* | (2019.01) |
| *G06F 16/13* | (2019.01) |
| *G06F 16/14* | (2019.01) |
| *H04L 9/32* | (2006.01) |
| *G06F 16/903* | (2019.01) |

(52) U.S. Cl.
CPC .......... *G06F 3/0653* (2013.01); *G06F 3/0604* (2013.01); *G06F 3/067* (2013.01); *G06F 3/0608* (2013.01); *G06F 3/0641* (2013.01); *G06F 3/0683* (2013.01); *G06F 16/137* (2019.01); *G06F 16/152* (2019.01); *G06F 16/9014* (2019.01); *H04L 9/3236* (2013.01); *H04L 9/3242* (2013.01); *H04L 9/3247* (2013.01); *G06F 16/90344* (2019.01); *H04L 2209/38* (2013.01)

(58) Field of Classification Search
None
See application file for complete search history.

(56) References Cited

U.S. PATENT DOCUMENTS

| | | | |
|---|---|---|---|
| 7,930,559 B1 * | 4/2011 | Beaverson | G06F 11/1453 713/193 |
| 8,086,585 B1 | 12/2011 | Brashers et al. | |
| 8,874,866 B1 | 10/2014 | Tyson | |
| 8,996,535 B1 * | 3/2015 | Kimmel | G06F 3/0641 707/747 |
| 10,049,078 B1 | 8/2018 | Volpe et al. | |

(Continued)

*Primary Examiner* — Sean D Rossiter
*Assistant Examiner* — Stephanie Wu
(74) *Attorney, Agent, or Firm* — Ryan, Mason & Lewis, LLP

(57) ABSTRACT

Example embodiments of the present invention relate and a method and an apparatus for managing a short hash handle. The method including receiving an I/O including a first identifier for a data block and examining the first identifier in comparison with a second identifier. The data block identified in the I/O then may be managed according to the first identifier and the second identifier.

20 Claims, 16 Drawing Sheets

(56) References Cited

U.S. PATENT DOCUMENTS

| | | |
|---|---|---|
| 2003/0182291 A1 | 9/2003 | Kurupati et al. |
| 2006/0271540 A1* | 11/2006 | Williams ................ G06F 16/10 |
| 2007/0260643 A1 | 11/2007 | Borden et al. |
| 2008/0307189 A1 | 12/2008 | Mityagin et al. |
| 2009/0271366 A1 | 10/2009 | Ellison et al. |
| 2011/0202744 A1 | 8/2011 | Kulkarni et al. |
| 2011/0218967 A1 | 9/2011 | Siiger et al. |
| 2012/0017138 A1 | 1/2012 | Erez et al. |
| 2012/0084519 A1 | 4/2012 | Vijayan et al. |
| 2012/0173844 A1 | 7/2012 | Punde |
| 2013/0151524 A1 | 6/2013 | McKenney et al. |
| 2013/0322146 A1 | 12/2013 | Agarwal et al. |
| 2014/0064091 A1 | 3/2014 | Basso et al. |
| 2015/0039627 A1 | 2/2015 | Sen et al. |
| 2017/0300592 A1 | 10/2017 | Breslow et al. |

* cited by examiner

METHOD AND APPARATUS FOR CREATING A SHORT HASH HANDLE HIGHLY CORRELATED WITH A GLOBALLY-UNIQUE HASH SIGNATURE

CROSS REFERENCE TO RELATED APPLICATION

This Application is a Continuation of U.S. patent application Ser. No. 15/067,574 entitled "METHOD AND APPARATUS FOR CREATING A SHORT HASH HANDLE HIGHLY CORRELATED WITH A GLOBALLY-UNIQUE HASH SIGNATURE" filed on Mar. 11, 2016, which is a Continuation of U.S. patent application Ser. No. 14/144,644 entitled "METHOD AND APPARATUS FOR CREATING A SHORT HASH HANDLE HIGHLY CORRELATED WITH A GLOBALLY-UNIQUE HASH SIGNATURE" filed on Dec. 31, 2013, now U.S. Pat. No. 9,286,003, the teachings of which applications are hereby incorporated herein by reference in their entireties.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage, and more specifically to creating a hash handle for use in data storage.

BACKGROUND

Storage systems in general, and block based storage systems specifically, are a key element in modern data centers and computing infrastructure. These systems are designed to store and retrieve large amounts of data, by providing a data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of the data that they store and retrieve. However, a completely different scheme in which data, internally within the storage system, is mapped and managed based on its content instead of its address has many substantial advantages. For example, it improves storage capacity efficiency since any duplicate data block will only occupy the actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance. This is a result of the fact that the implementation of content based storage scheme faces several challenges:

(a) intensive computational load which is not easily distributable or breakable into smaller tasks, (b) an inherent need to break large blocks into smaller block sizes in order to achieve content addressing at fine granularity. This block fragmentation dramatically degrades the performance of existing storage solutions, (c) inability to maintain sequential location of data blocks within the storage systems, since mapping is not address based any more, and such inability causes dramatic performance degradation with traditional spinning disk systems, (d) the algorithmic and architectural difficulty in distributing the tasks associated with content based mapping over a large number of processing and storage elements while maintaining single content-addressing space over the full capacity range of the storage system.

A number of issues arise with respect to such devices, and it is necessary to consider such issues as performance, lifetime and resilience to failure of individual devices, overall speed of response and the like.

Such devices may be used in highly demanding circumstances where failure to process data correctly can be extremely serious, or where large scales are involved, and where the system has to be able to cope with sudden surges in demand.

SUMMARY

Example embodiments of the present invention relate to a method and an apparatus for managing a short hash handle. The method includes receiving an input/output (I/O) including a first identifier for a data block and examining the first identifier in comparison with a second identifier. The data block identified in the I/O then may be managed according to the first identifier and the second identifier.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
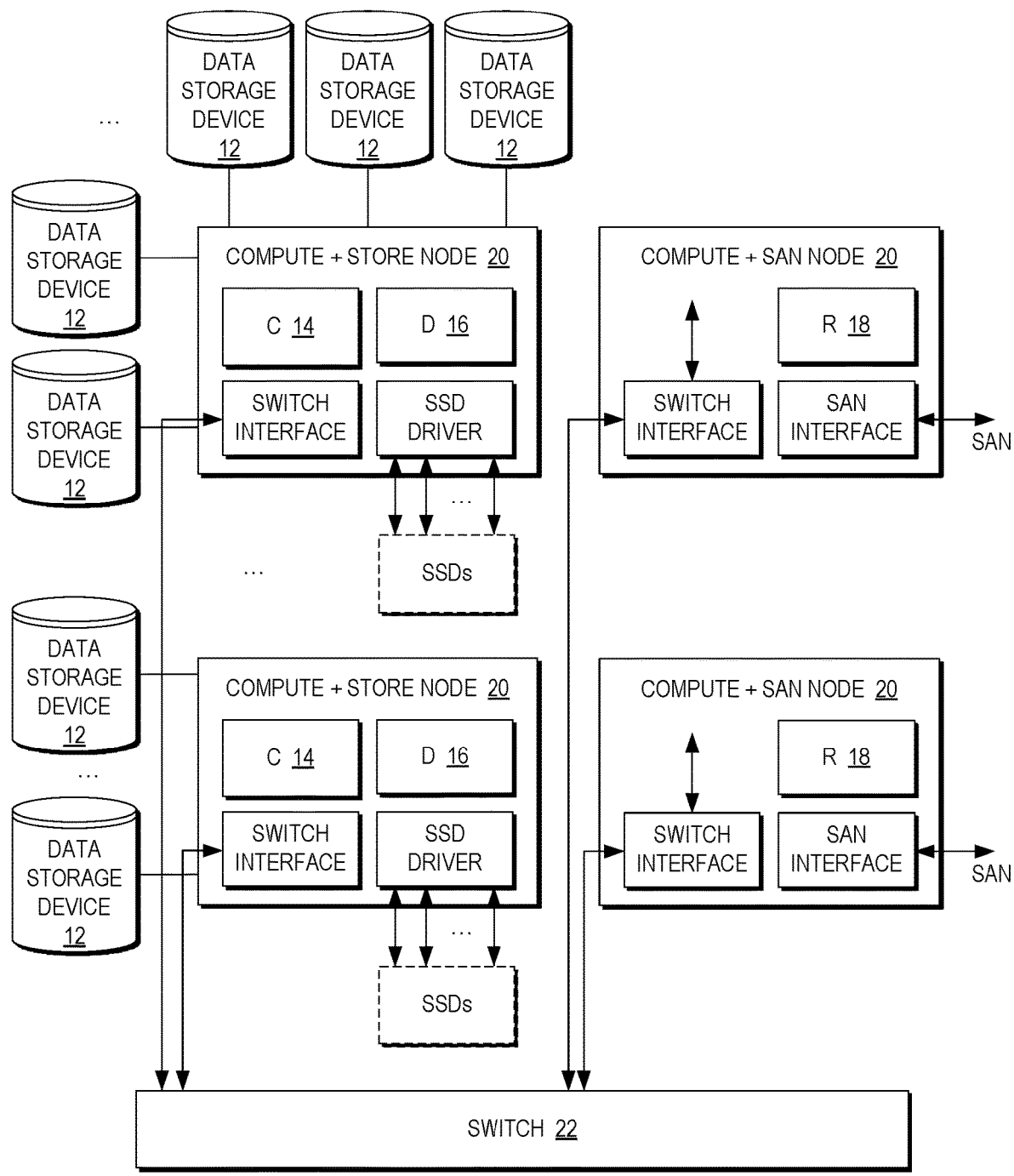
FIG. 1 is a simplified diagram schematically illustrating a system for data storage, having separate control and data planes.

In a Content Addressable Storage (CAS) array, data is stored in blocks, for example of 4 KB, where each block has a unique large hash signature, for example of 20 bytes, saved on Flash memory. As described herein, hash signatures are accessed by small in-memory handles (Called herein short hash handles), for example of 5 bytes. These handles are unique to each array, but not necessarily unique across arrays. When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it is faster to send the data without a hash signature, and let the target calculate the hash signature.) While the short hash handles are readily available without the need to read from Flash, since the short hash handles are not unique, they cannot be easily used to check if a target contains a hash signature. In some implementations, short hash handles are shortcuts for hash signatures, and can give a reliable hint of the existence of a hash signature in an array. Described herein is an approach to use these short hash handles, verify them through the hash signature, and send the data as needed. While the description describes using this approach with de-duplication storage devices, it would be appreciated by one of ordinary skill in the art that the approach described herein may be used with any type of storage device including those that do not use de-duplication.

The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored. Content addressable data storage can be used to ensure that data appearing twice is stored at the same location. Hence unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability, since control operations can be split over any number of processing elements, and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

The principles and operation of an apparatus and method according to the present invention may be better understood with reference to the drawings and accompanying description.

Reference is now made to FIG. 1 which illustrates a system 10 for scalable block data storage and retrieval using content addressing. The system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control modules 14 may control execution of read and write commands. The data modules 16 are connected to the storage devices and, under control of a respective control module, pass data to or from the storage devices. Both the C and D modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10.

The routing modules may use hash values, calculated from data associated with the operations, to select the control module for the distribution. More particularly, selection of the control module may use hash values, but typically relies on the user address and not on the content (hash). The hash value is, however, typically used for selecting the Data (D) module, and for setting the physical location for data storage within a D module.

The storage devices may be solid state random access storage devices, as opposed to spinning disk devices; however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 20 on the network, and the nodes are connected over the network by a switch 22.

The use of content addressing with multiple data modules selected on the basis of the content hashing, and a finely-grained mapping of user addresses to Control Modules allow for a scalable distributed architecture.

A glossary is now given of terms used in the following description:

X-PAGE—A predetermined-size aligned chunk as the base unit for memory and disk operations. Throughout the present description the X-Page size is referred to as having 4 KB, however other smaller or larger values can be used as well and nothing in the design is limited to a specific value.

LUN or LOGICAL UNIT NUMBER, is a common name in the industry for designating a volume of data, or a group of data blocks being named with the LUN. Each data block is referred to, by the external user of the storage system, according to its LUN, and its address within this LUN LOGICAL X-PAGE ADDRESS—Logical address of an X-Page. The address contains a LUN identifier as well as the offset of the X-Page within the LUN.

LOGICAL BLOCK—512 bytes (sector) aligned chunk, which is the SCSI base unit for disk operations.

LOGICAL BLOCK ADDRESS—Logical address of a Logical Block. The logical block address contains a LUN identifier as well as the offset of the logical block within the LUN.

SUB-LUN—Division of a LUN to smaller logical areas, to balance the load between C modules. Each such small logical area is called a sub-LUN.

SUB-LUN UNIT SIZE—The fixed size of a sub-LUN.

X-Page Data—Specific sequence of user data values that resides in an X-Page. Each such X-Page Data is uniquely represented in the system by its hash digest.

D PRIMARY—The D module responsible for storing an X-Page's Data

D BACKUP—The D module responsible for storing a backup for an X-Page Data. The backup is stored in a non-volatile way (NVRAM or UPS protected).

Acronyms:
LXA—Logical X-Page Address.
LB—Logical Block.
LBA—Logical Block Address.
AUS—Atomic Unit Size.
SL—Sub-LUN.
SLUS—Sub-LUN Unit Size.
MBE—Management Back End.

The examples described herein implement a block-level storage system, offering basic and advanced storage functionality. The design may be based on a distributed architecture, where computational, Storage Area Networking (SAN), and storage elements are distributed over multiple physical Nodes, with all such Nodes being inter-connected over an internal network through a switch device. The distributed architecture enables the scaling of the system's capabilities in multiple aspects, including overall storage capacity, performance characteristics in bandwidth and I/O operations per second (TOPS), computational resources, internal and external networking bandwidth, and other. While being based on a distributed architecture, the system presents, externally, a unified storage system entity with scalable capabilities.

The system's architecture and internal algorithms implementing the basic and advanced storage functions are optimized for improved utilization of the capabilities of random-access memory/storage media, as opposed to contrast with mechanical-magnetic spinning disk storage media. The optimizations are implemented in the design itself, and may, for example, include the ability to break incoming writes into smaller blocks and distribute the operation over different Nodes. Such an adaptation is particularly suitable for random access memory/storage media but is less suitable in a spinning-disk environment, as it would degrade performance to extremely low levels. The adaptation includes the content/hash based mapping of data distributes the data over different D Nodes in general and within D Nodes over different SSD devices. Again, such a scheme is more suitable for random access memory/storage media than for a spinning-disk media because such spread of data blocks would result in very poor performance in the spinning disk case. That is to say, the described elements of the present architecture are designed to work well with random access media, and achieve benefits in performance, scalability, and functionality such as inline deduplication. Such random-access memory media can be based on any or a combination of flash memory, DRAM, phase change memory, or other memory technology, whether persistent or non-persistent, and is typically characterized by random seek/access times and random read/write speeds substantially higher than those exhibited by spinning disk media. The system's internal data block mapping, the algorithms implementing advanced storage functions, and the algorithms for protecting data stored in the system are designed to provide storage performance and advanced storage functionality at substantially higher performance, speed, and flexibility than those available with alternative storage systems.

Data mapping within the system is designed not only to improve performance, but also to improve the life span and reliability of the electronic memory media, in cases where the memory technology used has limitations on write/erase cycles, as is the case with flash memory. Lifetime maximization may be achieved by avoiding unnecessary write operations as will be explained in greater detail below. For the purpose of further performance optimization, life span maximization, and cost optimization, the system may employ more than a single type of memory technology, including a mix of more than one Flash technology (e.g., single level cell—SLC flash and multilevel cell—MLC flash), and a mix of Flash and DRAM technologies. The data mapping optimizes performance and life span by taking advantage of the different access speeds and different write/erase cycle limitations of the various memory technologies.

The core method for mapping blocks of data internally within the system is based on Content Addressing, and is implemented through a distributed Content Addressable Storage (CAS) algorithm.

This scheme maps blocks of data internally according to their content, resulting in a mapping of identical blocks to the same unique internal location. The distributed CAS algorithm allows for scaling of the CAS domain as overall system capacity grows, effectively utilizing and balancing the available computational and storage elements in order to improve overall system performance at any scale and with any number of computational and storage elements.

The system supports advanced In-line block level deduplication, which may improve performance and save capacity.

Elements of the system's functionality are: Write (store) data block at a specified user address; Trim data block at a specified user address; Read data block from a specified user address; and In-line block level deduplication.

The following features may be provided: (1) A distributed CAS based storage optimized for electronic random-access storage media; The optimization includes utilizing storage algorithms, mainly the content-based uniformly-distributed mapping of data, that inherently spread data in a random way across all storage devices. Such randomization of storage locations within the system while maintaining a very high level of performance is preferably achievable with storage media with a high random access speed; (2) A distributed storage architecture with separate control and data planes; Data mapping that maximizes write-endurance of storage media; System scalability; (3) System resiliency to fault and/or failure of any of its components; (4) Use of multi-technology media to maximize write-endurance of storage media; and (5) In-line deduplication in ultrahigh performance storage using electronic random-access storage media.

The examples described herein implement block storage in a distributed and scalable architecture, efficiently aggregating performance from a large number of ultra-fast storage media elements (SSDs or other), preferably with no performance bottlenecks, while providing in-line, highly granular block-level deduplication with no or little performance degradation.

One challenge is to avoid performance bottlenecks and allow performance scalability that is independent of user data access patterns.

The examples described herein may overcome the scalability challenge by providing data flow (Write, Read) that is distributed among an arbitrary and scalable number of physical and logical nodes. The distribution is implemented by (a) separating the control and data paths (the "C" and "D" modules), (b) maintaining optimal load balancing between all Data modules, based on the content of the blocks (through the CAS/hashing mechanisms), hence ensuring always balanced load sharing regardless of user access patterns, (c) maintaining optimal load balancing between all Control modules, based on the user address of the blocks at fine granularity, hence ensuring always balanced load sharing regardless of user access patterns, and (d) performing all internal data path operations using small granularity block size, hence detaching the incoming user access pattern from the internal access pattern, since the user pattern is generally larger than the block size.

A second challenge is to support inline, highly granular block level deduplication without degrading storage (read/write speed) performance. The result should be scalable in both capacity—which is deduplicated over the full capacity space—and performance.

The solution involves distributing computation-intensive tasks, such as calculating cryptographic hash values, among an arbitrary number of nodes. In addition, CAS metadata and its access may be distributed among an arbitrary number of nodes. Furthermore, data flow algorithms may partition read/write operations in an optimally-balanced way, over an arbitrary and scalable number of Nodes, while guaranteeing consistency and inline deduplication effect over the complete storage space.

In detaching the data from the incoming pattern, the R-Module breaks up any incoming block which is larger than the granularity size across sub-LUNs, sending the relevant parts to the appropriate C-Modules. Each C-module is predefined to handle a range or set of Sub-LUN logical addresses. The C-Module breaks up the block it receives for distribution to D-Modules, at a pre-determined granularity, which is the granularity for which a Hash is now calculated. Hence the end result is that a request to write a certain block (for example of size 64 KB) ends up being broken up into for example 16 internal writes, each write comprising a 4 KB block.

The specific numbers for granularity can be set based on various design tradeoffs, and the specific number used herein of 4 KB is merely an example. The broken down blocks are then distributed to the D modules in accordance with the corresponding hash values.

A further challenge is to address flash-based SSD write/erase cycle limitations, in which the devices have a lifetime dependent on the number of write/erase cycles.

The solution may involve Inline deduplication to avoid writing in all cases of duplicate data blocks. Secondly, content (hash) based mapping to different data modules and SSDs results in optimal wear-leveling, ensuring equal spread of write operations to all data modules and SSDs independently of the user data/address access patterns.

In the following a system is considered from a functional point of view. As described above with respect to FIG. 1, the system 10 is architected around four main functional Modules designated R (for Router), C (for Control), D (for Data), and H (for Hash). Being modular and scalable, any specific system configuration includes at least one of R, C, D, and H, but may include a multiplicity of any or all of these Modules.

Figure 2:
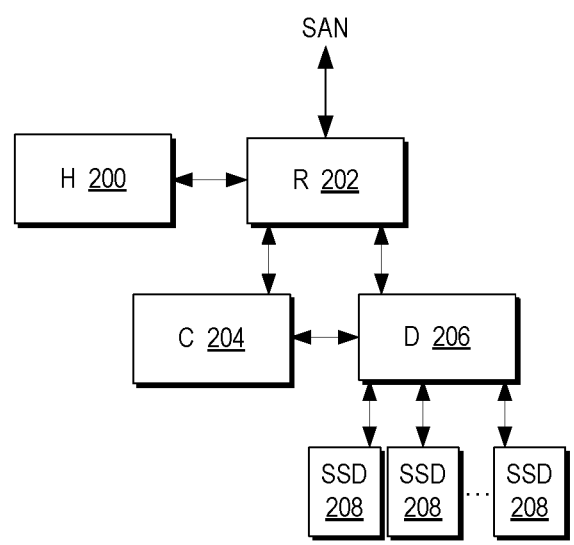
FIG. 2 shows an exemplary configuration of modules for the system of FIG. 1.

Reference is now made to FIG. 2, which is a functional block diagram of the system in which an H module 200 is connected to an R module 202. The R module is connected to both Control 204 and data 206 modules. The data module is connected to any number of memory devices SSD 208.

A function of the R Module 202 is to terminate SAN Read/Write commands and route them to appropriate C and D Modules for execution by these Modules. By doing so, the R Module can distribute workload over multiple C and D Modules, and at the same time create complete separation of the Control and Data planes, that is to say provide separate control and data paths.

A function of the C Module 204 is to control the execution of a Read/Write command, as well as other storage functions implemented by the system. It may maintain and manage key metadata elements.

A function of the D Module 206 is to perform the actual Read/Write operation by accessing the storage devices 208 (designated SSDs) attached to it. The D module 206 may maintain metadata related with the physical location of data blocks.

A function of the H Module is to calculate the Hash function value for a given block of data.

Figure 3:
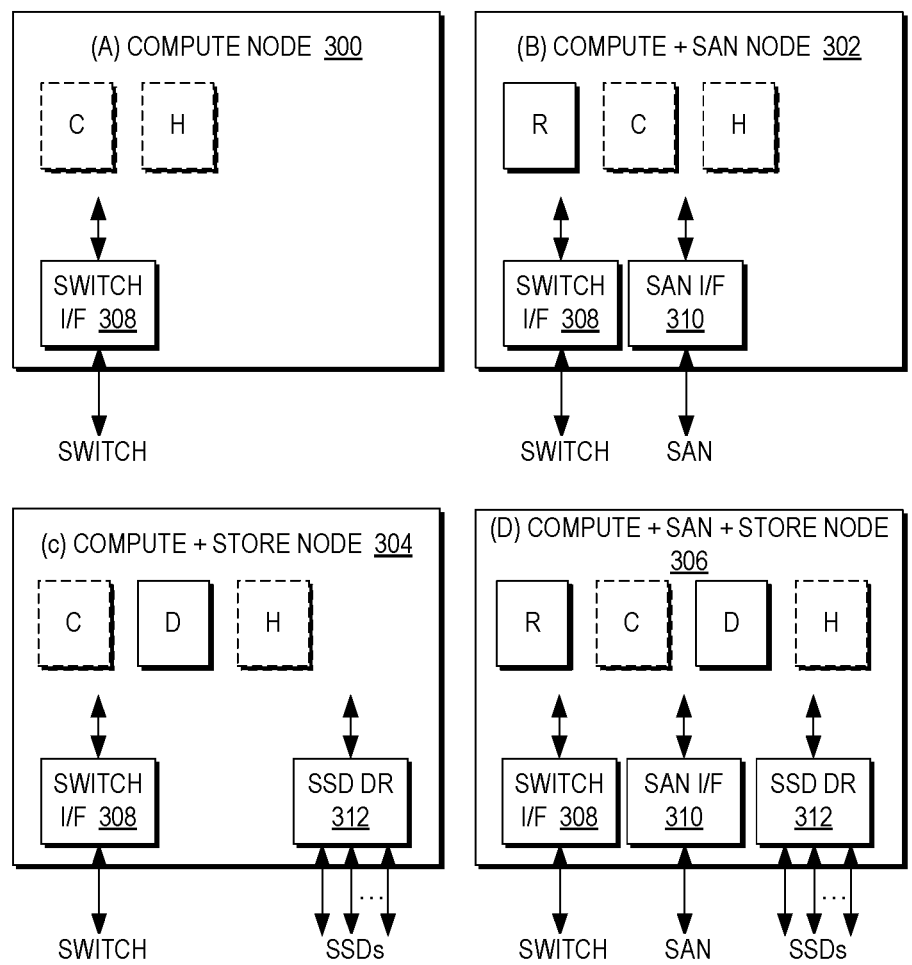
FIG. 3 is a simplified diagram schematically illustrating four different node configurations for the system.

Reference is now made to FIG. 3, which illustrates nodes. The R, C, D, and H Modules may be implemented in software, and executed on a physical Node. A system includes at least one physical Node, and may include multiple Nodes. There are four possible Node configurations: Compute Node 300, which includes control and hash modules, Compute+SAN Node 302 which includes a router as well as control and hash modules, Compute+Store Node 304, which includes a data module in addition to compute and hash modules, and a Compute+SAN+Store Node 306, which includes all four modules. A system includes a storage area networking or SAN function within at least one Node, and a Store function within at least one Node. The SAN function and the store function can be supported by the same physical Node or any combination of multiple Nodes.

In FIG. 3 each node type shows the functional Modules that execute, in at least one copy, within the Node, and functional Modules that may optionally execute within this Node. Optional Modules are shown in dashed line.

All Nodes include a switch interface 308, to allow interconnecting with a switch in a multi-Node system configuration. A Node that contains a SAN function includes at least one SAN Interface module 310 and at least one R Module. A Node that contains a Store function includes at least one SSD Driver Module 312 and at least one D Module. Hence, Compute+SAN and Compute+SAN+STORE Nodes contain a SAN Interface, to interface with the external SAN. The interface may typically use a SCSI-based protocol running on any of a number of interfaces including Fiber Channel, Ethernet, and others, through which Read/Write and other storage function commands are being sent to the system. Compute+Store and Compute+SAN+Store Nodes contain an SSD driver 312 to interface with SSDs 208 attached to that specific Node, where data is stored and accessed.

Figure 4:
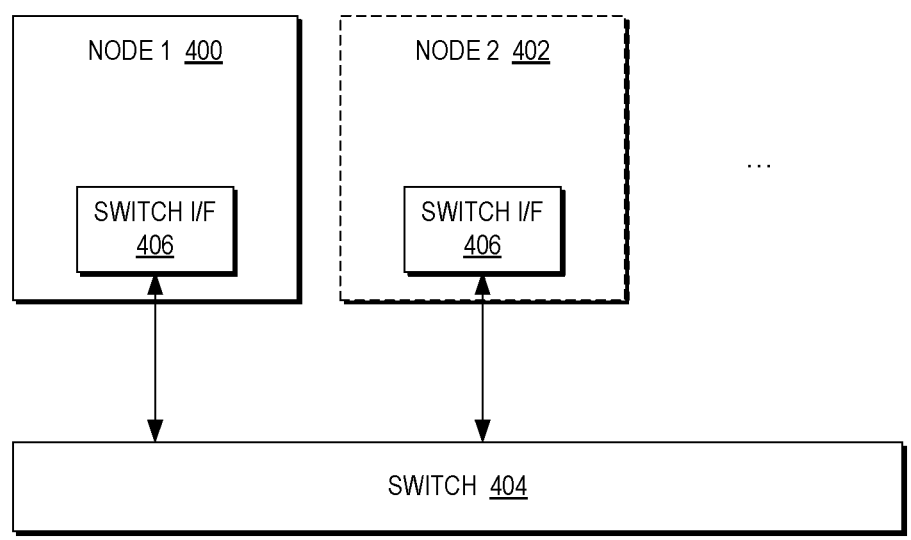
FIG. 4 is a simplified schematic diagram showing the nodes of FIG. 3 connected to a switch.

Reference is now made to FIG. 4, which shows a high level system block diagram. A system implementation includes one or more Nodes 400, 402. In all cases where a system contains more than two Nodes, all physical Nodes are interconnected by a switch 404 which may be based on any of a number of networking technologies including Ethernet, InfiniBand and so forth. In the specific case of a 2-Node system, the two Nodes can be interconnected directly without a need for a switch.

The interconnections between each Node and the Switch may include redundancy, so as to achieve high system availability with no single point of failure. In such a case, each Node may contain two or more Switch Interface modules 406, and the Switch may contain two or more ports per physical Node.

Figure 5:
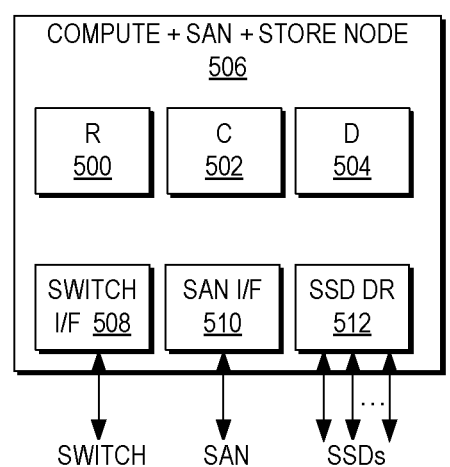
FIG. 5 is a simplified diagram showing a compute+SAN+ store node for the device of FIG. 1.

As an example FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four node system configuration is shown in FIG. 1 above. The configuration includes two compute and store nodes and two compute+SAN nodes.

A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

The R module is responsible for: routing SCSI I/O requests to the C modules, guarantee execution and return the result; and balancing the work load between the C modules for the requests it is routing.

An A→C table indicates which C module is responsible for each logical X-page address (LXA). Each C module is responsible for a list of Sub LUNs (SLs).

The R module receives requests for I/Os from the SAN INTERFACE, routes them to the designated C modules and returns the result to the SAN INTERFACE.

If an I/O operation spans across multiple SLs, and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE.

The R module is responsible for maintaining an up-to-date A→C table coordinated with the MBE. The A→C table is expected to balance the range of all possible LXAs between the available C modules.

For write operations, the R module instructs the calculation of the hash digest for each X-Page by requesting such calculation from a Hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H→D table maps each range of hash digests to the corresponding D module responsible for this range.

An A→H table maps each LXA that belongs to the SLs C is responsible for, to the hash digest representing the X-Page Data that currently resides in this address.

The C module receives I/O requests from R modules, distributes the work to the D modules, aggregates the results and guarantees an atomic operation. The result is returned to the R module.

The C module maintains an up-to-date H→D table coordinated with the MBE. The table is expected to balance the range of all possible hash digests between the available D modules.

The C module maintains an A→H table in a persistent way. The C module may initiate 110 requests to D modules in order to save table pages to disk, and read them from disk. To avoid frequent disk operations, a Journal of the latest table operations may be maintained.

Data is balanced between the C modules based on the logical address, at the granularity of sub-LUNs.

The D module is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules, perform them and returning a result.

The D module is also responsible for, for each write operation, backing up the X-Page Data in the designated D backup module and performing read-modify operations for writes that are smaller than X-Page size (This process also involves computing a hash digest for these X-Pages).

The D module is further responsible for maintaining an up-to-date H→(D, Dbackup) table coordinated with the MBE. The H→(D, Dbackup) table is expected to balance the range of all possible hash digests between the available D modules.

The D module does not communicate directly with R modules. The only interaction with R modules involves RDMA read/write operations of X-Page Data.

Balancing between the D modules is based on hashing of the content.

The D module makes use of a hash digest metadata table. The hash digest metadata table maps each in use hash digest, that represents actual X-Page Data, to its metadata information including its physical page on the storage media (SSD), its memory copy (if it exists), a mapping to any backup memory copy and a reference count for the purpose of deduplication.

A further structure used is the H→(D, Dbackup) table. The H→(D, Dbackup) table maps each range of hash digests to the corresponding D module responsible for the range as well as the Dbackup module responsible for the range.

The D modules allocate a physical page for each X-Page. The D modules also manage the memory for the physical storage. They allocate memory pages for read/write operations and perform background destaging from memory to storage media when necessary, for example, when running low on memory.

The D modules manage a separate nonvolatile memory pool (NVRAM or UPS protected) for X-Page Data backup purposes. The backup holds X-Pages that are held in memory of the D primary and have not yet been destaged. When re-balancing between D modules occurs (due to a D module failure for example), the D module may communicate with other D modules in order to create new backup copies or move a primary ownership as required.

The D modules allow deduplication per X-Page Data by maintaining a persistent reference count that guarantees only one copy per X-Page Data. The D modules manage the hash digest metadata table in a persistent way. The table is coordinated with the physical layout for physical pages allocation, with the memory pointer, memory backup pointer and deduplication reference count.

The D modules receive I/O requests from C modules, perform the requests while supporting deduplication and return the result. The D modules may perform RDMA read/write operations on memory that resides in other modules, such as R modules as mentioned above, as part of the I/O operation.

When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the Hash function of a given block of data, effectively mapping an input value to a unique output value. The Hash function may be based on standards based hash functions such as Sha-1 and MD5, or based on a proprietary function. The hash function is selected to generate a uniformly distributed output over the range of potential input values.

The H modules usually share nodes with an R module but more generally, the H modules can reside in certain nodes, in all nodes, together with R modules, or together with C or D modules.

The following discussion provides high level I/O flows for read, write and trim.

Throughout these flows, unless noted otherwise, control commands are passed between modules using standard RPC messaging, while data "pull" operations may use RDMA read. Data push (as well as Journal) operations may use RDMA write.

The read flow of one X-Page may consist of one R module which receives the read request from the application, one C module in charge of the address requested and one D module which holds the X-Page to be read. Larger, or unaligned, requests may span several X-Pages and thus may involve several D modules. These requests may also span several SLs, in which case they may involve several C modules as well.

Figure 6:
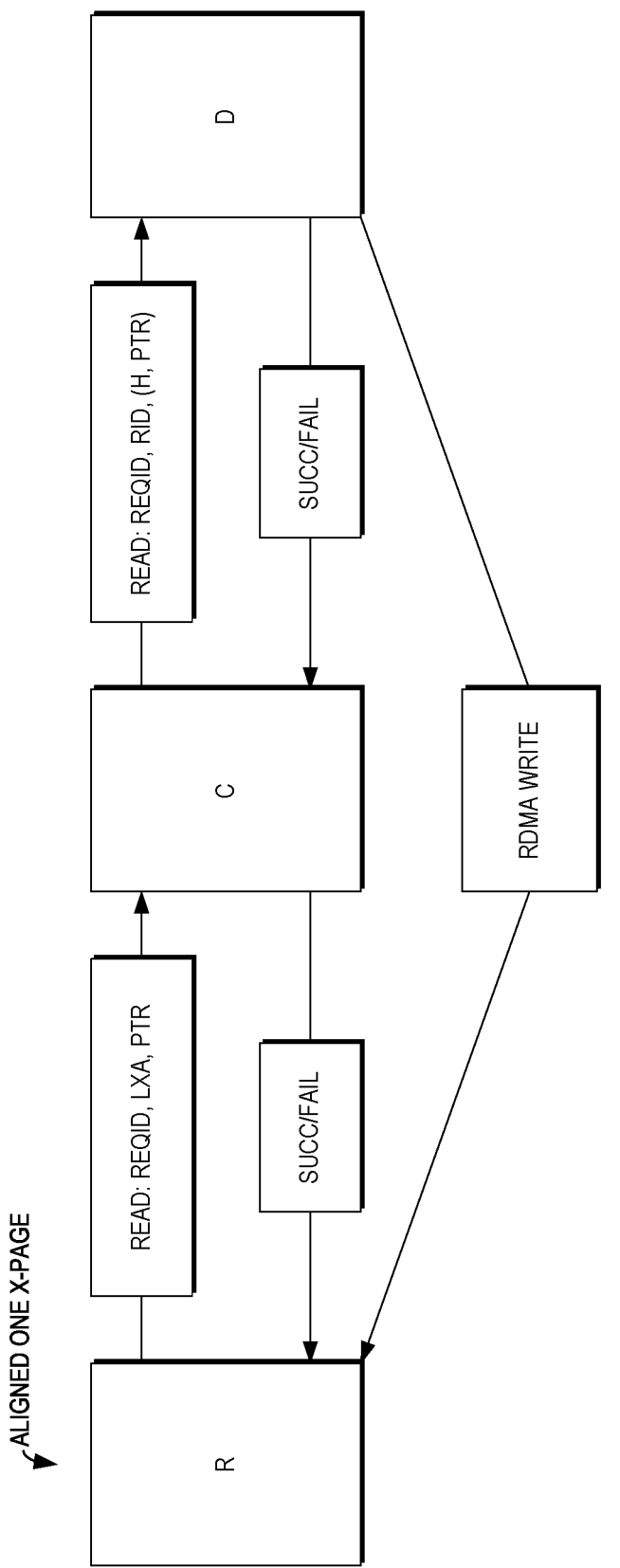
FIG. 6 is a simplified flow chart which illustrates the flow for a read operation for one aligned X-page.

Reference is now made to FIG. 6 which illustrates the flow for a read operation for one aligned X-page. When the R module receives a read request from an application the R module allocates a request ID for the operation; translates the LBA to LXA; allocates a buffer for the data to be read; consults the A→C component to determine which C module is in charge of this LXA; and sends the designated C module a read request which includes parameters that include a request ID; an LXA; and a pointer to the allocated buffer.

The C module, when receiving the request, consults the A→H component, from which it obtains a hash digest representing the X-Page to be read; consults the H→D component to determine which D module holds the X-Page in question; and sends this D module a read request which includes parameters that include a request ID (as received from the R module), the hash digest, a pointer to the buffer to read to, as received from the R module; and an identifier of the R module.

The D module, when receiving the request, reads the data of the requested X-Page from SSD and performs an RDMA write to the requesting R module, specifically to the pointer passed to it by the C module.

Finally the D module returns success or error to the requesting C module.

The C module in turn propagates success or error back to the requesting R module, which may then propagate it further to answer the application.

Figure 7:
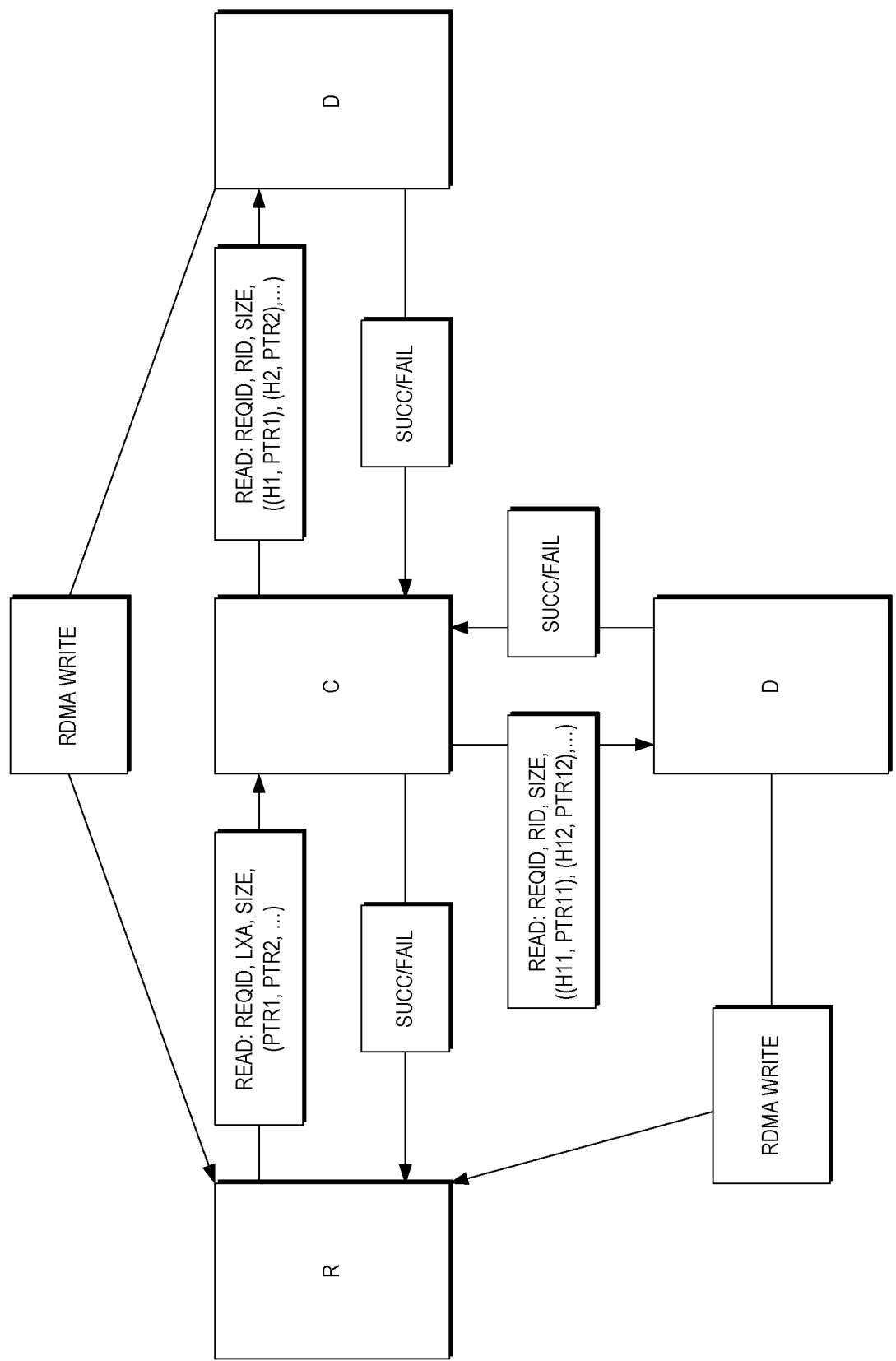
FIG. 7 is a simplified flow chart which illustrates the flow in the event that a read request arrives for a range of addresses spanning more than one X-Page but only one SL.

Reference is now made to FIG. 7, which illustrates the flow in the case that a read request arrives for a range of addresses spanning more than one X-Page but only one SL. In such a case the R module sends the designated C module a read command with the parameters that include a request ID, first LXA, size of the requested read in X-Pages-n, and n pointers to the allocated X-Page buffers.

The rest of the R module's treatment is identical to the aligned one X-Page scenario previously described herein.

The C module, when receiving the request divides the logical address space to LXAs. For each LXA the C module consults the A→H component to determine the corresponding hash digest; consults the H→D table to determine which D module is responsible for the current LXA; sends each D module a read command containing all the hashes that the respective D module is responsible for. The parameters of the read command include a request ID (as received from the R module); a list of respective hash-pointer pairs; and the identifier of the R module.

Each D module, when receiving the request, acts per hash-pointer pair in the same manner as described above for one X-Page. Aggregated success or error is then sent to the requesting C module.

The C module aggregates all the results given to it by the D modules and returns success or error back to the requesting R module, which may then answer the application.

In the case that a read request spans multiple SLs, the R module splits the request and sends several C modules read requests. Each C module may receive one request per SL. The flow may continue as in the simpler case above, except that now the R module aggregates the responses before it answers the application.

Read requests smaller than 4 KB, as well as requests not aligned to 4 KB, may be dealt with at the R module level. For each such parcel of data, the R module may request to read the encompassing X-Page. Upon successful completion of the read command, the R module may crop the non-relevant sections and return only the requested data to the application.

The write flow of one X-Page may consist of one R module which receives the write request from the application, one C module in charge of the address requested and three D modules: Dtarget which is in charge of the X-Page Data to be written (according to its appropriate hash digest), Dold which was in charge of the X-Page Data this address contained previously ("old" hash digest), and Dbackup in charge of storing a backup copy of the X-Page Data to be written.

Figure 8:
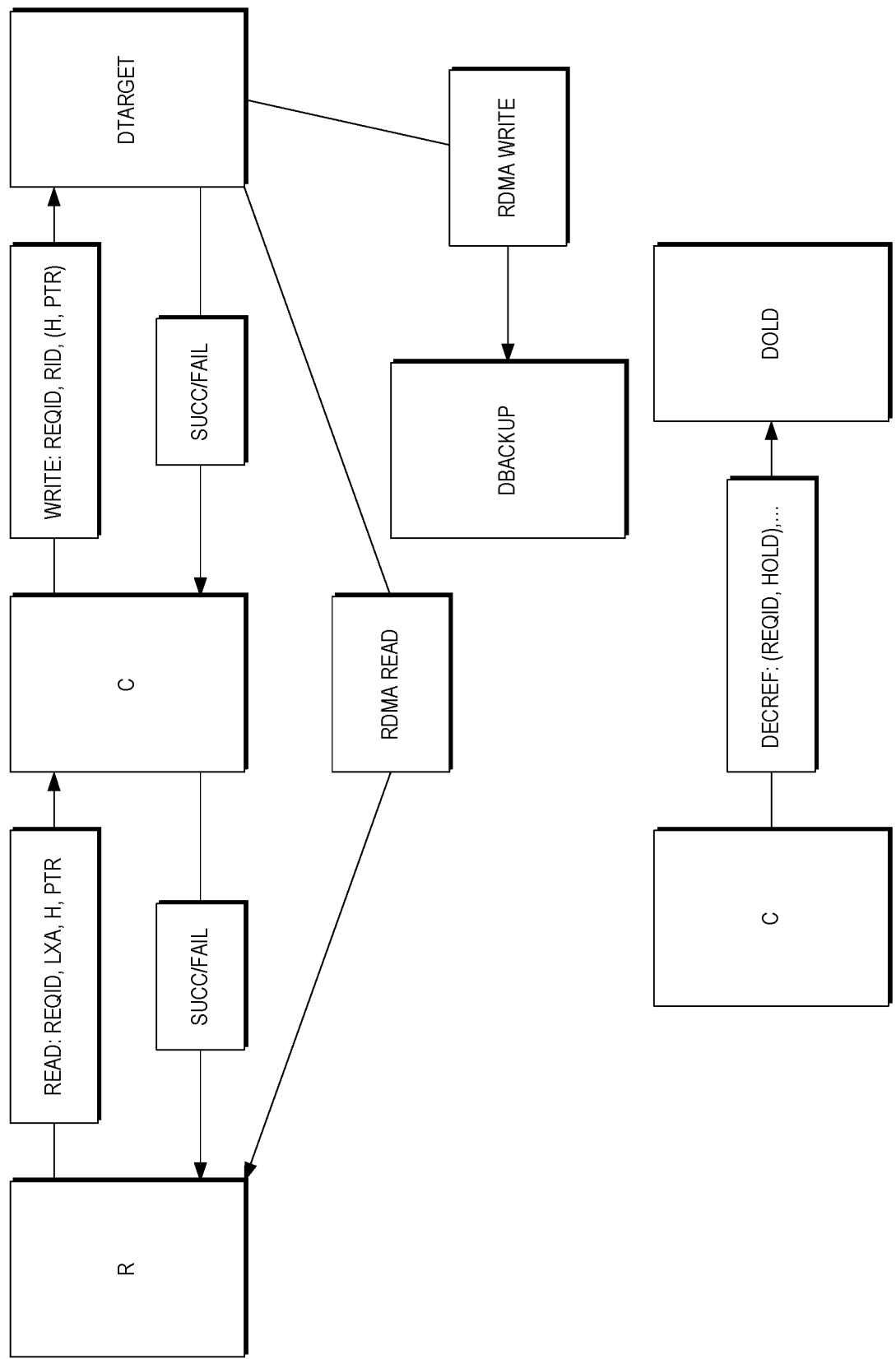
FIG. 8 is a simplified flow diagram illustrating the write procedure for a single aligned X page.

Reference is now made to FIG. 8, which is a simplified flow diagram illustrating the write procedure for a single aligned X page according to the examples described herein.

When an R module receives a write request from the application, the R module allocates a request ID for this operation; translates the LBA to an LXA; computes a hash digest on the data to be written; consults its A→C component to determine which C module is in charge of the current LXA; and sends the designated C module a write command with parameters that include a request ID; an LXA; a hash digest; and a pointer to the buffer containing the data to be written.

The C module, when receiving the request consults its H→D component to understand which D module is in charge of the X-Page to be written (Dtarget); and sends Dtarget a write request with parameters that include the request ID (as received from the R module); the hash digest (as received from the R module); the pointer to the data to write (as received from the R module); and the identifier of the R module.

The D module receiving the write command, Dtarget, may first check if it already holds an X-Page corresponding to this hash. There are two options here:

First, Dtarget does not have the X-Page. In this case Dtarget fetches the data from the R module using RDMA read and stores it in its memory; consults the H→D component to determine which D module is in charge of storing a backup copy of this X-Page (Dbackup); performs an RDMA write of the X-Page Data to the Dbackup backup memory space; and returns success (or failure) to the C module.

Second, Dtarget has the X-Page. In this case Dtarget increases the reference count, returns success (or failure) to the C module.

The C module waits for a response from Dtarget. If a success is returned, the C module updates the A→H table to indicate that the LXA in question should point to the new hash and returns a response to the requesting R module.

If this is not a new entry in the A→H table, the C module asynchronously sends a decrease reference count command to Dold (the D module responsible for the hash digest of the previous X-Page Data). These commands may be aggregated at the C module and sent to the D modules in batches.

The R module may answer the application once it receives a response from the C module.

Figure 9:
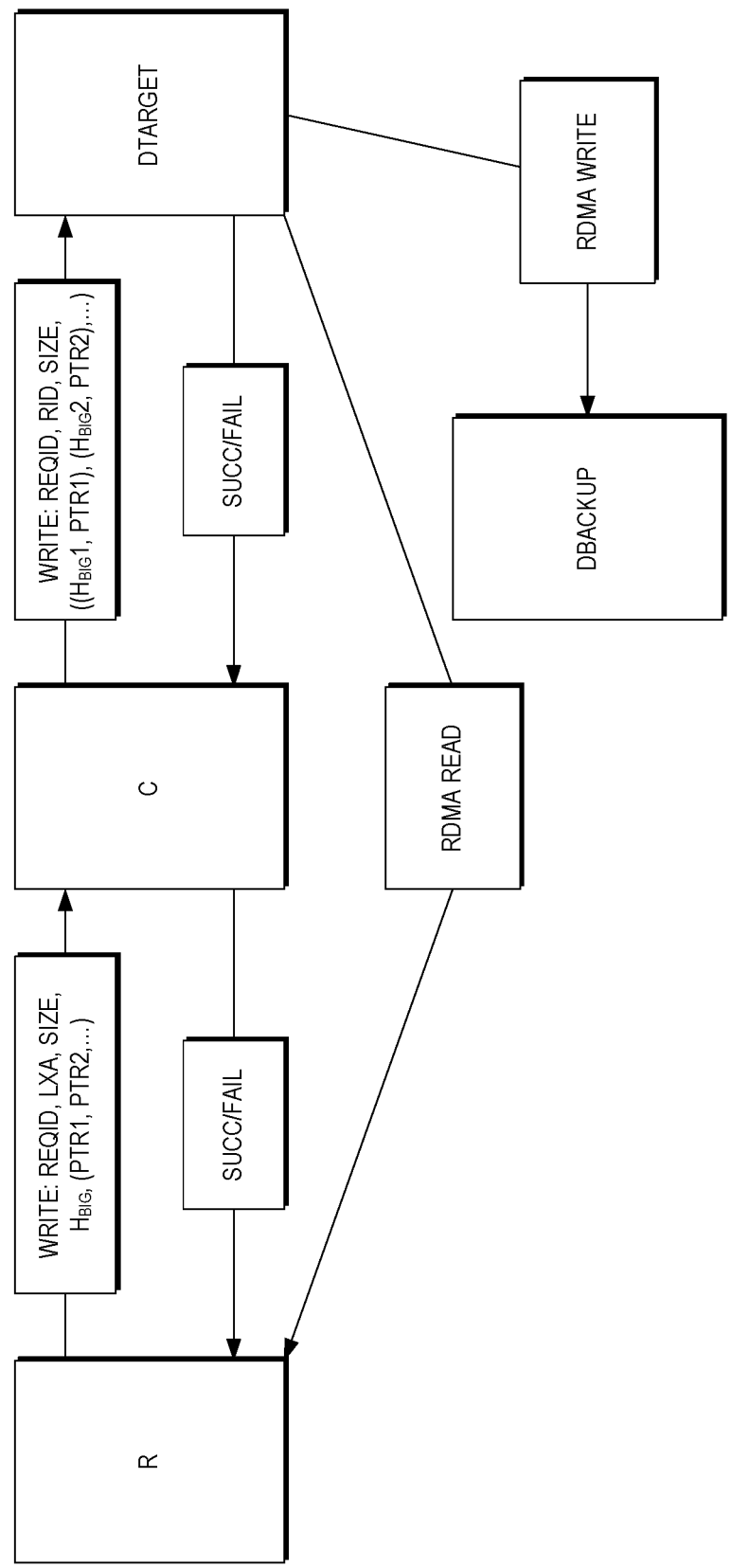
FIG. 9 is a simplified flow diagram illustrating the process for performing write operations to multiple full X-Pages.

Reference is now made to FIG. 9, which is a flow diagram illustrating the process for writes to multiple full X-Pages.

In the case that the write request spans a range of addresses which include more than one X-Page but only one SL, the R module sends the designated C module a write command with parameters that include a request ID; a first LXA; a size of the requested write in LXAs-n; and HBIG which is a unique identifier of the entire chunk of data to be written. HBIG may be a computed hash digest and thus equal for two identical chunks of data.

Additional parameters sent with the write command are n pointers that point to the buffers which hold the data to be written.

The rest of the R module treatment is the same as for the aligned one X-Page scenario.

The C module, when receiving the request, consults its H→D component to understand which D module is in charge of HBIG (Dtarget) and generates a hash digest per pointer by replacing one byte of HBIG with the offset of that pointer. It is noted that this byte must not collide with the bytes used by the H→D table distribution.

It may send Dtarget a write request with the parameters that include the request ID (as received from the R module); a list of respective hash-pointer pairs; and the Identifier of the R module.

The D module, when receiving the request, acts per hash-pointer pair in the same manner as described above for one X-Page. Aggregated success or error is then sent to the requesting C module.

The C module waits for a response from Dtarget. If the response indicates success, the C module updates its A→H table to indicate that the LXAs in question should point to the new hashes. Updating of entries in the A→H table may be done as an atomic operation, to ensure the write request is atomic. Note that all requests aligned to 4 KB (or another predefined block size) that fall within a SL may be atomic. The C module returns a response to the requesting R module. The C module adds the list of old hashes to the "decrease reference" batch if needed.

The R module answers the application once it receives a response from the C module.

In the case in which a write request spans multiple SLs, the R module splits the request and sends smaller write requests to several C modules. Each C module receives one request per SL (with a unique request ID). The flow continues as in the simpler case above, except that now the R module aggregates the responses before it answers the application.

Figure 10:
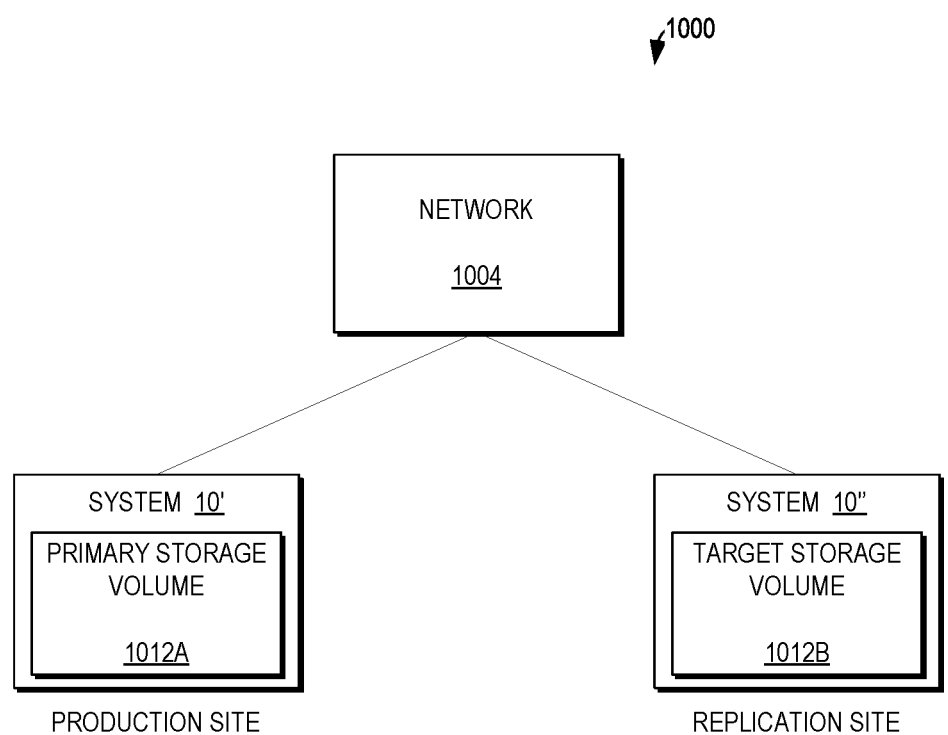
FIG. 10 is a simplified block diagram of a data protection system.

Referring to FIG. 10, the system 10 can be a system 10' located at a production site and system 10 can also be a system 10" located at a replication site. The system 10' includes a primary storage volume 1012a and the system 10" includes a target storage volume 1012b. The target storage volume replicates the primary storage volume 1012a using the network 1004. In one example, the primary storage volume 1012a and the target storage volume 1012b are each on a respective disk. In one particular example, the primary storage volume 1012a and the target storage volume 1012b are each on a respective flash memory.

Figure 11:
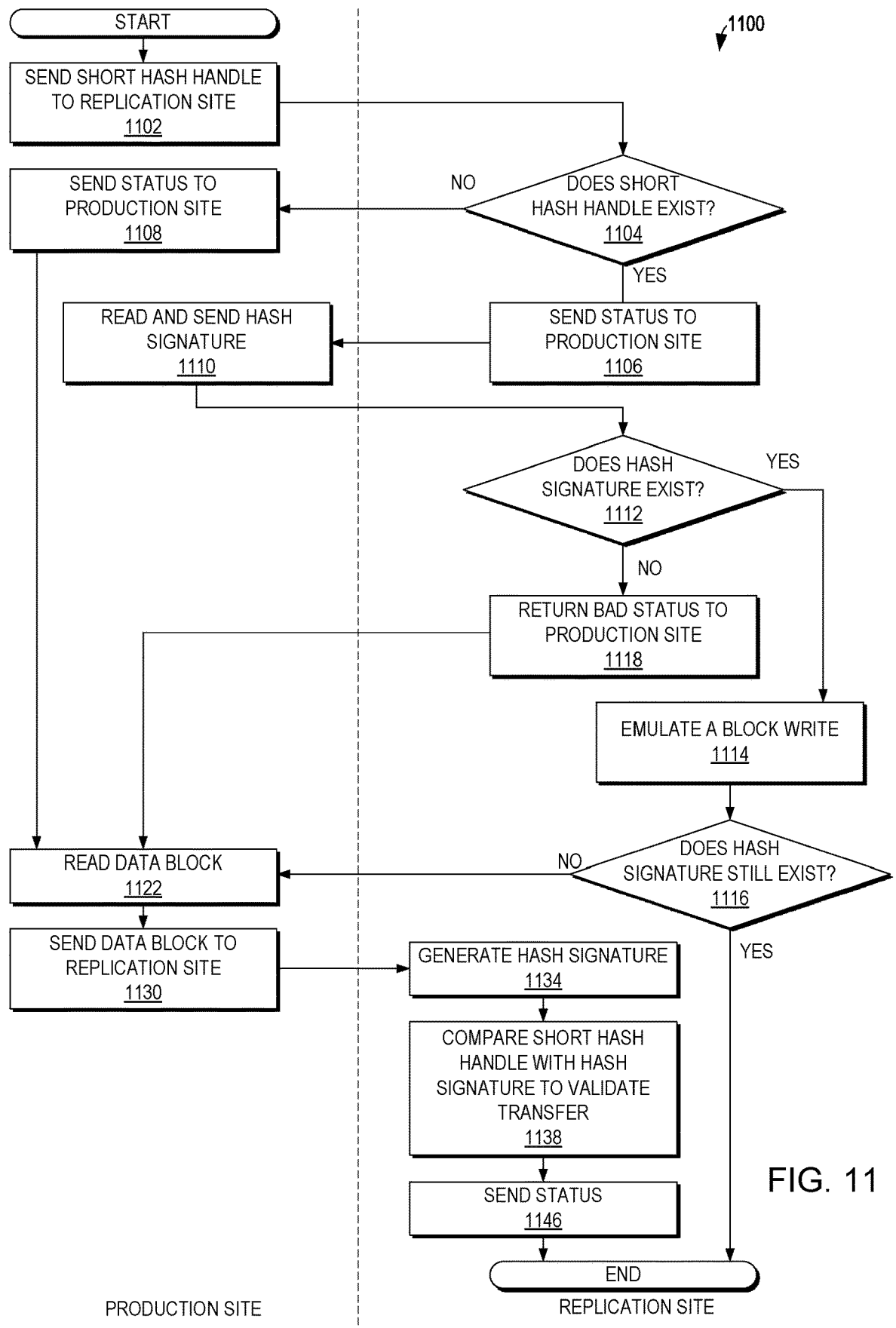
FIG. 11 is a flowchart of an example of a process to replicate a first storage volume at a second storage volume.

Referring to FIG. 11, an example of a process to replicate a first storage volume at a second storage volume is a process 1100. The goal of process 1100 is to instruct the target system 10" to write a block of data into a certain volume at a certain address. Normally, this requires sending volume information, an address and a block of data. In process 1100, the system 10' always sends the volume and address information, but tries to avoid sending the data.

Process 1100 sends a short hash handle to a replication site (1102). Each data block in the primary storage volume 1012a is represented by a hash signature (sometimes referred to as a full hash signature). A hash signature is unique, meaning if two hash signatures are the same then their corresponding data blocks are the same. Each hash signature may also be represented by a short hash handle generated by using, for example, the process 1200 in FIG. 12A. A short hash handle is smaller in size than the hash signature. Short hash handles are not necessarily world-wide unique. For example, even though two hash handles are the same it does not mean that the corresponding hash signatures or their corresponding data blocks are the same. In one particular example, using the process 1200, the chances of two exact hash handles not having the same hash signatures is one in five thousand. In one example, the short hash handle is sent from a system 10' at the production site to the system 10" at the replication site. In one particular example, several hundred hash handles are sent at once.

Process 1100 determines if the short hash handle sent from the production site exists at the replication site (1104). For example, the system 10" determines if it has the same short hash handle.

If the short hash handle exists at the replication site, process 1100 sends a status to a production site (1106). For example, system 10" sends a status back to the system 10' that the short hash handle exists at the replication site. If the short hash handle does not exist in processing block 1104, process 1100 sends a status back to the production site indicating that the short hash handle does not exist at the replication site (1108). For example, system 10" sends a status back to the system 10' that the short hash handle does not exist at the replication site.

Process 1100 reads and sends the hash signature to the replication site if the short hash handle sent by the production site exists on the replication site (1110). For example, the system 10' reads and sends the hash signature associated with the short hash handle that it sent to the replication site in processing block 1102 to the replication site.

Process 1100 determines if the hash signature exists at the replication site (1112) and if the hash signature exists at the replication site, emulate a block write on the target (1114). For example, the target array updates its A→H table with the hash signature or short hash handle sent in the processing block 1110. Process 1100 determines if the hash signature still exists (1116) and if the hash signature still exists process 1100 ends. If the hash signature does not still exist, process 1100 goes to processing block 1122 described herein.

If the hash signature does not exist, process 1100 returns a bad status to the productions site (1118). For example, system 10" sends a bad status message to the system 10' indicating that the hash signature sent by the production site does not exist on the replication site. In general, it is unlikely that the hash signature does not exist. In some implementations there are "artificial hash handles" which do not match (or hint) of the full hash signature. For those, process 1200 can be modified to either always return a status that there is a short hash handle at the replication site or always indicate that there is no short hash handle at the replication site. Indicating that there is a short hash handle at the replication site is preferable in systems where the hash signature associated with an artificial hash handle is always in cache.

If the short hash handle does not exist or a bad status message is received, process 1100 reads the data block associated with the hash signature (1122) and writes data block to replication site (1130). For example, the system 10' reads the data block from the primary storage volume 1012a associated with the hash signature and sends the data block to the system 10" to be written on the target storage volume 1012b.

Process 1100 generates a hash signature (1134). For example, the target array allocates a new page of data in module D, generates a new hash signature for this block of data, and then updates the A→H table with the hash signature.

Process 1100 compares the short hash handle with the hash signature to validate transfer (1138) and sends status (1146). For example, system 10" compares the hash signature with the short hash handle. For example, system 10" generates a hash signature on the data block and compares it with the short hash handle sent at processing block 1102. In implementations where the short hash handle is derived from the hash signature, the two should match.

Figure 12A:
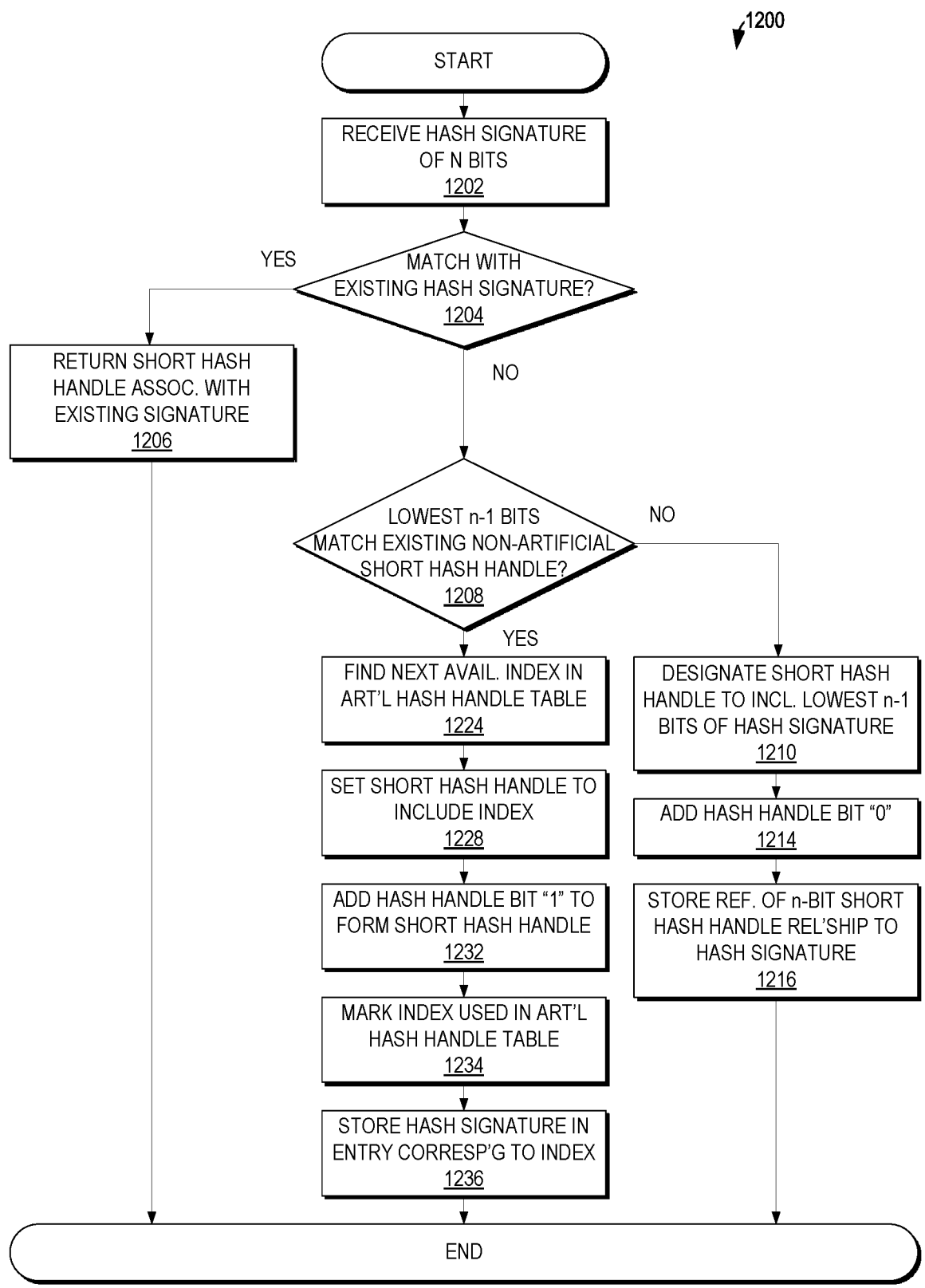
FIG. 12A is a flowchart of an example of a process to convert a hash signature to a short hash handle.

Referring to FIG. 12A, an example of a process to convert a hash signature to a short hash handle is a process 1200. Process 1200 is performed by system 10' and system 10" independently.

Process 1200 receives a hash signature of N bits (1202) and determines if there is a match with an existing hash signature (1204). If there is a match process 1200 returns the short hash handle associated with the existing signature (1206).

If there is no match with an existing hash signature, process 1200 determines if the lowest n−1 bits match an existing non-artificial short hash handle (1208).

If the lowest n−1 bits do not match an existing non-artificial short hash handle, process 1200 designates the short hash handle to include the lowest n−1 bits of the N-bit hash signature (1210) and adds a hash handle bit equal to "0" to form an n-bit short hash handle (1214). For example, the hash handle bit may be a most significant bit or a least significant bit.

Process 1200 stores a reference of the n-bit short hash handle relationship to the hash signature (1216). For example, processing block 1216 can be performed using a hash tree or a hash table.

If the lowest n−1 bits match an existing non-artificial short hash handle, process 1200 finds a next available index in an artificial hash handle table (1224). An artificial hash table includes an array of indexes where each index is n−1 bits and each entry includes space to store a N-bit hash signature.

Process 1200 sets the short hash handle to include the index (1228) and adds a hash handle bit equal to "1" to form a n-bit short hash handle (1232). For example, the hash handle bit may be a most significant bit or a least significant bit. The n-bit short hash handle formed by processing blocks 1228 and 1232 is called an artificial hash handle.

Process 1200 marks the index as "used" in the artificial hash handle table (1234) and stores the hash signature in the entry corresponding to the index (1236).

Figure 12B:
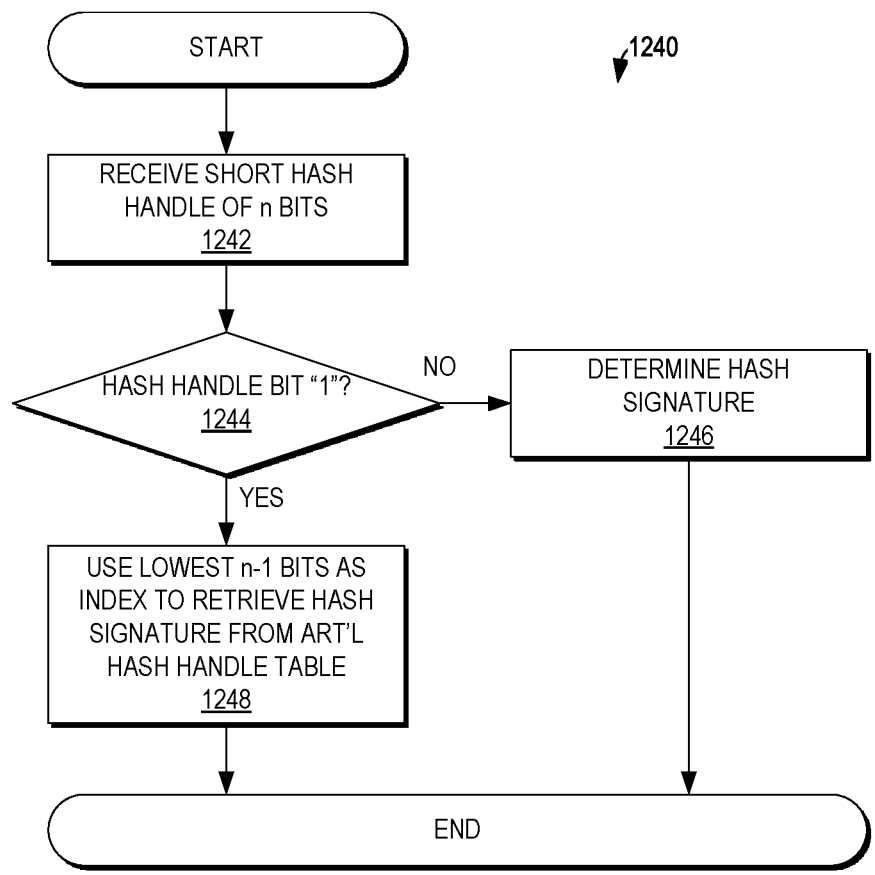
FIG. 12B is a flowchart of an example of a process to convert a short hash handle to a hash signature.

Referring to FIG. 12B, an example of a process to convert a short hash handle to a hash signature is a process 1240. Process 1240 is performed by system 10' and system 10" independently. Process 1240 receives a short hash handle of n-bits (1242) and determines if the hash handle bit is a "1" (1244).

If the hash handle bit is not a "1", process 1240 determines the hash signature (1246). For example, process 1240 uses the n-bit short hash handle to determine the hash signature that was stored using the processing block 1216.

If the hash handle bit is a "1", process 1240 uses the lowest n−1 bits as an index to retrieve the hash signature from the artificial hash handle table (1248).

Figure 12C:
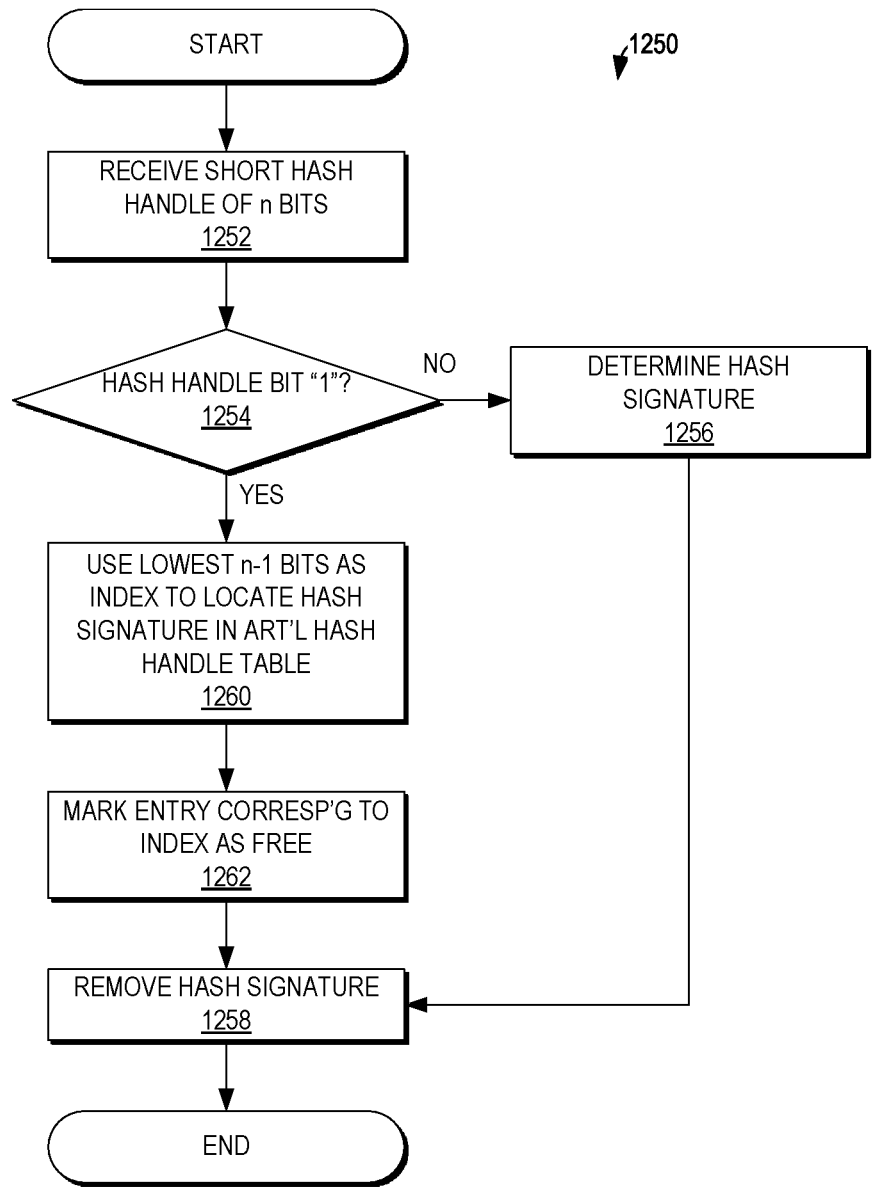
FIG. 12C is a flowchart of an example of a process to remove a short hash handle.

Referring to FIG. 12C, an example of a process to remove a short hash handle is a process 1250. Process 1200 is performed by system 10' and system 10" independently Process 1250 receives a short hash handle of n-bits (1252) and determines if the hash handle bit is a "1" (1254).

If the hash handle bit is not a "1", process 1250 determines the hash signature (1256) and removes the hash signature (1258). For example, process 1250 uses the n-bit short hash handle to determine the hash signature that was stored using the processing block 1216 and removes the hash signature.

If the hash handle bit is a "1", process 1250 uses the lowest n−1 bits as index to locate the hash signature in the artificial hash handle table (1260), marks the entry corresponding to the index as free (1262) and repeats processing block 1258.

Figure 13:
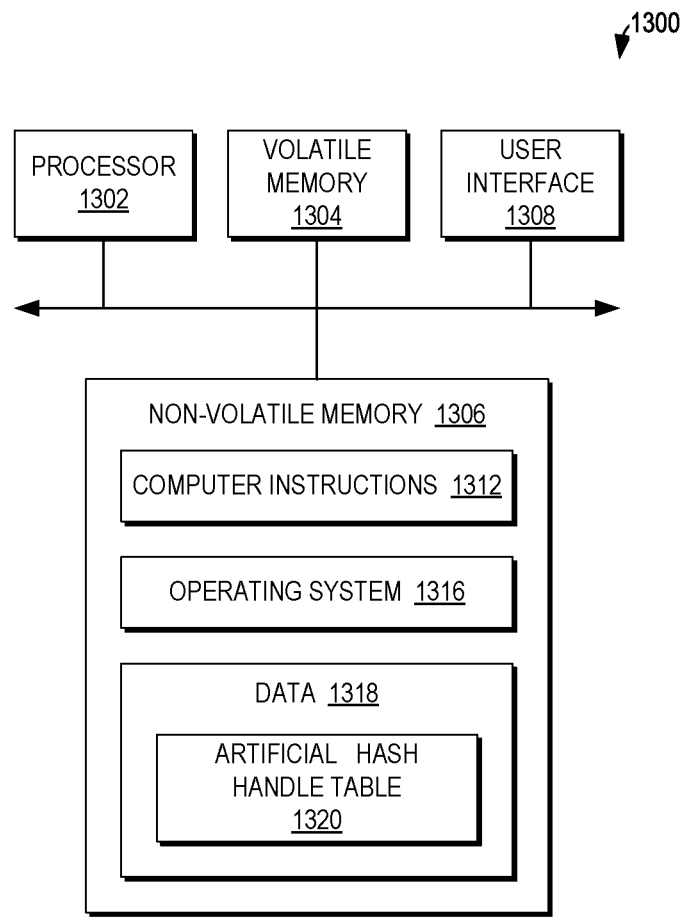
FIG. 13 is a computer on which all or part of the process of FIGS. 11 and 12A to 12C may be implemented.

Referring to FIG. 13, in one example, a computer 1300 includes a processor 1302, a volatile memory 1304, a non-volatile memory 1306 (e.g., hard disk) and the user interface (UI) 1308 (e.g., a graphical user interface, a mouse, a keyboard, a display, touch screen and so forth). The non-volatile memory 1306 stores computer instructions 1312, an operating system 1316 and data 1318. Data 1318 includes an artificial hash handle table 1320. In one example, the computer instructions 1312 are executed by the processor 1302 out of volatile memory 1304 to perform all or part of the processes described herein (e.g., processes 1100, 1200, 1240 and 1250).

The processes described herein (e.g., processes 1100, 1200, 1240 and 1250) are not limited to use with the hardware and software of FIG. 13; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system.

However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 1100, 1200, 1240 and 1250 are not limited to the specific processing order of FIGS. 11, 12A, 12B and 12C, respectively. Rather, any of the processing blocks of FIGS. 11, 12A, 12B and 12C may be re-ordered, combined or removed, performed in parallel or in serial, as necessary, to achieve the results set forth above.

One of ordinary skill in the art would recognize that the setting of a hash handle bit to a "0" or "1" as described herein is arbitrary. One of ordinary skill in the art could have set the hash handle bits to an opposite value than described and modified the processes accordingly and still achieved the same results.

The processing blocks (for example, in the processes 1100, 1200, 1240 and 1250) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 13, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 14:
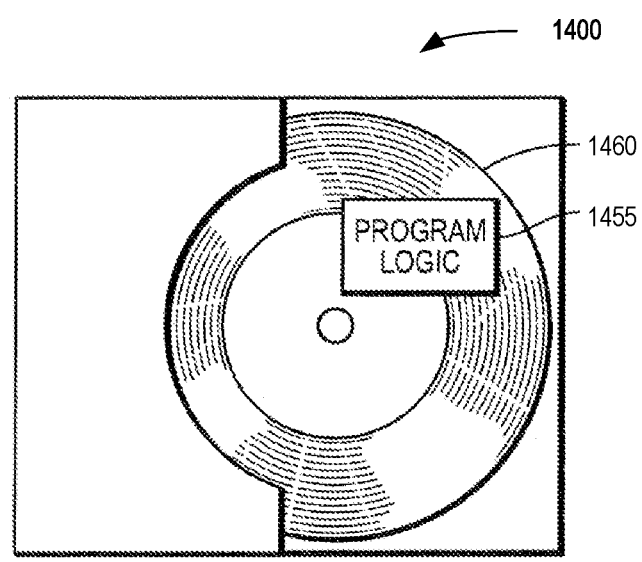
FIG. 14 is a diagram of an example embodiment of the present invention embodied as a computer program product.

FIG. 14 shows program logic 1455 embodied on a computer-readable medium 1460 as shown, and wherein the logic 1455 is encoded in computer-executable code configured for carrying out the methods of this invention, thereby forming a computer program product 1400.

The logic for carrying out the method may be embodied as part of the aforementioned system, which is useful for carrying out a method described with reference to embodiments shown. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
receiving a hash handle;
determining whether a value of a hash handle bit of the hash handle is a first value or a second value;
responsive to determining that the value of the hash handle bit is the first value:
identifying a corresponding hash signature in a data structure based at least in part on at least a first portion of the hash handle, the corresponding hash signature comprising the at least the first portion of the hash handle; and
removing the corresponding hash signature from the data structure;
responsive to determining that the value of the hash handle bit is the second value:
identifying a given index in an array of indices that corresponds to the hash handle, each index having a corresponding entry, the given index comprising at least a second portion of the hash handle, the entry corresponding to the given index storing a given hash signature;
marking the entry corresponding to the given index as free; and
removing the given hash signature from the entry corresponding to the given index,
wherein the method is implemented by at least one processing device comprising a processor coupled to a memory.

2. The method of claim 1 wherein the hash handle is an n-bit hash handle and wherein the first portion of the hash handle comprises n−1 bits of the hash handle.

3. The method of claim 2 wherein the lowest n−1 bits of the corresponding hash signature comprises the first portion of the hash handle.

4. The method of claim 1 wherein the hash handle is an n-bit hash handle and wherein the second portion of the hash handle comprises n−1 bits of the hash handle.

5. The method of claim 4 wherein the given index comprises n−1 bits and wherein the n−1 bits of the given index comprises the second portion of the hash handle.

6. The method of claim 1 wherein the hash handle is an n-bit hash handle and wherein the hash handle bit is a most significant bit of the hash handle.

7. The method of claim 1 wherein the hash handle is an n-bit hash handle and wherein the hash handle bit is a least significant bit of the hash handle.

8. A system comprising:
at least one processor coupled to memory, the at least one processor configured:
to receive a hash handle;
to determine whether a value of a hash handle bit of the hash handle is a first value or a second value;
responsive to determining that the value of the hash handle bit is the first value:
to identify a corresponding hash signature in a data structure based at least in part on at least a first portion of the hash handle, the corresponding hash signature comprising the at least the first portion of the hash handle; and
to remove the corresponding hash signature from the data structure;
responsive to determining that the value of the hash handle bit is the second value:
to identify a given index in an array of indices that corresponds to the hash handle, each index having a corresponding entry, the given index comprising at least a second portion of the hash handle, the entry corresponding to the given index storing a given hash signature;
to mark the entry corresponding to the given index as free; and
to remove the given hash signature from the entry corresponding to the given index.

9. The system of claim 8 wherein the hash handle is an n-bit hash handle and wherein the first portion of the hash handle comprises n−1 bits of the hash handle.

10. The system of claim 9 wherein the lowest n−1 bits of the corresponding hash signature comprises the first portion of the hash handle.

11. The system of claim 8 wherein the hash handle is an n-bit hash handle and wherein the second portion of the hash handle comprises n−1 bits of the hash handle.

12. The system of claim 11 wherein the given index comprises n−1 bits and wherein the n−1 bits of the given index comprises the second portion of the hash handle.

13. The system of claim 8 wherein the hash handle is an n-bit hash handle and wherein the hash handle bit is a most significant bit of the hash handle.

14. The system of claim 8 wherein the hash handle is an n-bit hash handle and wherein the hash handle bit is a least significant bit of the hash handle.

15. A computer program product comprising a non-transitory processor-readable storage medium having stored therein program code of one or more software programs, wherein the program code when executed by at least one processing device causes the at least one processing device:
  to receive a hash handle;
  to determine whether a value of a hash handle bit of the hash handle is a first value or a second value;
  responsive to determining that the value of the hash handle bit is the first value:
    to identify a corresponding hash signature in a data structure based at least in part on at least a first portion of the hash handle, the corresponding hash signature comprising the at least the first portion of the hash handle; and
    to remove the corresponding hash signature from the data structure;
  responsive to determining that the value of the hash handle bit is the second value:
    to identify a given index in an array of indices that corresponds to the hash handle, each index having a corresponding entry, the given index comprising at least a second portion of the hash handle, the entry corresponding to the given index storing a given hash signature;
    to mark the entry corresponding to the given index as free; and
    to remove the given hash signature from the entry corresponding to the given index.

16. The computer program product of claim 15 wherein the hash handle is an n-bit hash handle and wherein the first portion of the hash handle comprises n−1 bits of the hash handle.

17. The computer program product of claim 16 wherein the lowest n−1 bits of the corresponding hash signature comprises the first portion of the hash handle.

18. The computer program product of claim 15 wherein the hash handle is an n-bit hash handle and wherein the second portion of the hash handle comprises n−1 bits of the hash handle.

19. The computer program product of claim 18 wherein the given index comprises n−1 bits and wherein the n−1 bits of the given index comprises the second portion of the hash handle.

20. The computer program product of claim 15 wherein the hash handle is an n-bit hash handle and wherein the hash handle bit is one of a most significant bit of the hash handle and a least significant bit of the hash handle.

* * * * *